US012744722B2

(12) United States Patent
Takla et al.

(10) Patent No.: US 12,744,722 B2
(45) Date of Patent: Sep. 22, 2026

(54) SYSTEMS AND METHODS FOR ANOMALY DETECTION USING TEST CASE SIGNATURES

(71) Applicant: Verizon Patent and Licensing Inc., Basking Ridge, NJ (US)

(72) Inventors: Mourad B. Takla, Hillsborough, NJ (US); Stephen G. Maeske, Madison, NJ (US); Manish Kolhe, Allen, TX (US); Sankrith Subramanian, St. Petersburg, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 81 days.

(21) Appl. No.: 18/979,845

(22) Filed: Dec. 13, 2024

(65) Prior Publication Data

US 2026/0172337 A1 Jun. 18, 2026

(51) Int. Cl.
*H04L 43/50* (2022.01)
*H04L 41/0631* (2022.01)
*H04L 41/16* (2022.01)

(52) U.S. Cl.
CPC .......... *H04L 43/50* (2013.01); *H04L 41/0631* (2013.01); *H04L 41/16* (2013.01)

(58) Field of Classification Search
CPC ...... H04L 43/50; H04L 41/0631; H04L 41/16
See application file for complete search history.

(56) References Cited

U.S. PATENT DOCUMENTS

2023/0315849 A1* 10/2023 Viswanathan ........ G06F 21/577 726/23
2024/0414175 A1* 12/2024 Jiang .................. H04L 63/1425
2026/0037603 A1* 2/2026 Batra ................. G06F 18/2413

* cited by examiner

*Primary Examiner* — Suraj M Joshi

(57) ABSTRACT

A device may receive network data in a format that includes packets generated based on a test case, and may utilize a generative artificial intelligence model to generate respective signatures that summarize the packets within a context of the test case. The device may group the signatures based on protocols associated with the packets and to generate protocol-specific signature groups, and may analyze each of the protocol-specific signature groups independently to detect one or more anomalies in network elements being tested by the test case. The device may aggregate results from analyzing each of the protocol-specific signature groups to determine an overall result for the test case, and may perform one or more actions based on the overall result.

20 Claims, 14 Drawing Sheets

Figure 1B:
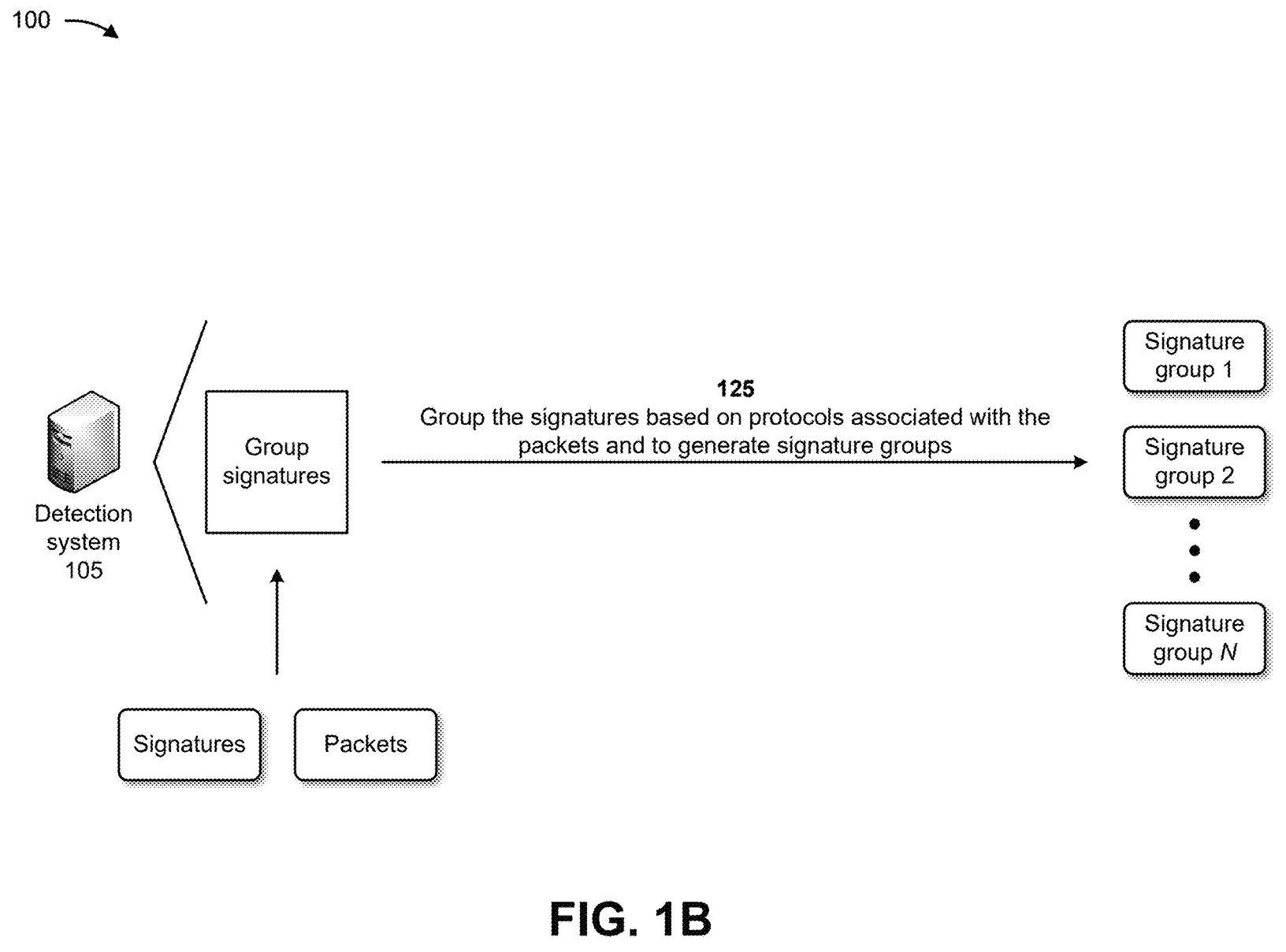

100

Detection system 105

Signatures

Packets

Group signatures

125

Group the signatures based on protocols associated with the packets and to generate signature groups Signature group 1

Signature group 2

Signature group *N*

SYSTEMS AND METHODS FOR ANOMALY DETECTION USING TEST CASE SIGNATURES

BACKGROUND

Telecommunications network operators conduct thousands of network element test cases on a daily basis. These test cases may help to maintain network reliability, performance, and security.

BRIEF DESCRIPTION OF THE DRAWINGS

FIGS. 1A-1J are diagrams of an example associated with validating in test cases.

DETAILED DESCRIPTION OF EXAMPLE EMBODIMENTS

Figure 1A:
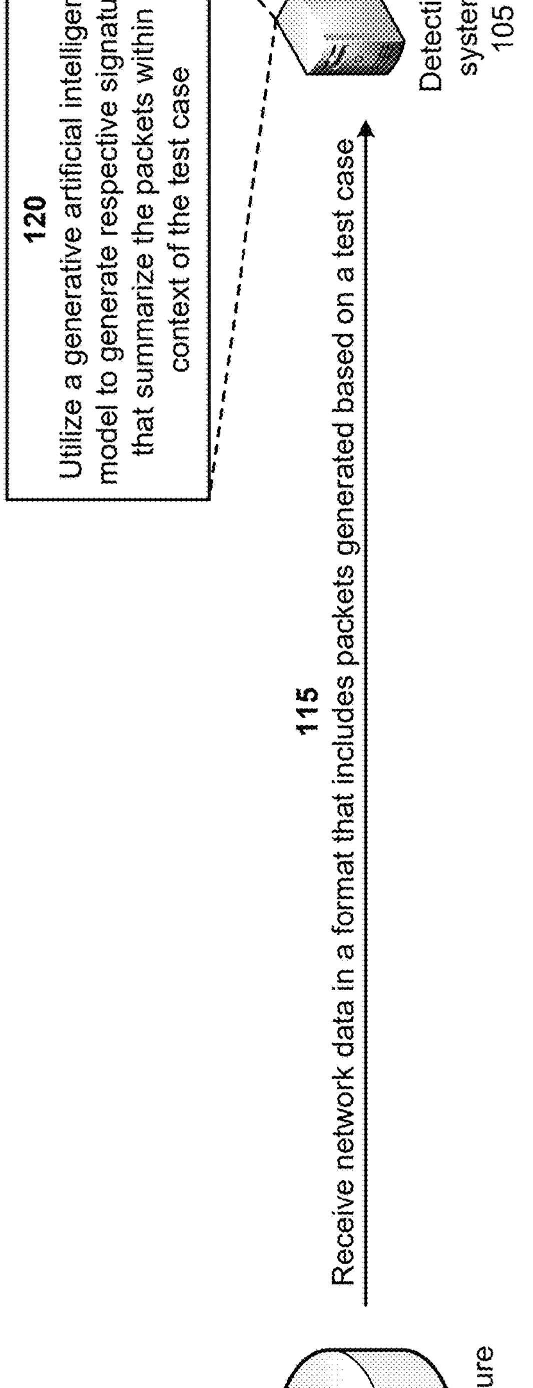

The following detailed description of example implementations refers to the accompanying drawings. The same reference numbers in different drawings may identify the same or similar elements.

A test case may generate a packet capture (PCAP) file with packets that record intricate interactions between various network elements in a format that is human-readable but requires expert analysis. However, the process of analyzing each test case is complex and time-consuming. Experts must painstakingly parse through each PCAP file, dissecting and understanding every packet, which involves recognizing and interpreting multiple layers of protocols and actions. Furthermore, the evaluation of test cases involves aggregating potentially hundreds or thousands of packets, each needing to be viewed collectively to ascertain a status of the test case. This represents a significant technical challenge in automating analysis of network test cases, impeding the ability to scale and adapt testing processes in an industry where rapid deployment of new technologies and features is paramount. Thus, current systems for analyzing network device test cases consume computing resources (e.g., processing resources, memory resources, communication resources, and/or the like), networking resources, and/or other resources associated with failing to summarize each packet with consistent fields, generating erroneous test case results based on failing to summarize each packet with consistent fields, failing to identify and address network issues based on the erroneous test case results, and/or the like.

Some implementations described herein relate to a detection system that validates test cases. For example, the detection system may receive network data in a format that includes packets generated based on a test case, and may utilize a generative artificial intelligence model to generate respective signatures that summarize the packets within a context of the test case. A signature may summarize a packet within the context of the test case. The detection system may group the signatures based on protocols (e.g., a telecommunication protocol and/or a transport protocol) associated with the packets and to generate protocol-specific signature groups, and may analyze each of the protocol-specific signature groups independently to detect one or more anomalies in network elements being tested by the test case. The detection system may aggregate results from analyzing each of the protocol-specific signature groups to determine an overall result for the test case, and may perform one or more actions based on the overall result.

In this way, the detection system validates test cases. For example, the detection system may simplify and automate the process of analyzing network test cases to determine pass or fail statuses. The detection system may utilize a generative artificial intelligence model to generate and group signatures for packets based on a test case. The detection system may group the signatures according to associated protocols, resulting in protocol-specific signature groups. The detection system may conduct an independent analysis of each protocol-specific signature group to detect anomalies within the test case, and may compile analysis results to ascertain an overall result for the test case. Thus, the detection system may conserve computing resources, networking resources, and/or other resources that would have otherwise been consumed by failing to summarize each packet with consistent fields, generating erroneous test case results based on failing to summarize each packet with consistent fields, failing to identify and address network issues based on the erroneous test case results, and/or the like.

FIGS. 1A-1J are diagrams of an example 100 associated with validating test cases. As shown in FIGS. 1A-1J, example 100 includes a detection system 105 associated with a data structure 110. The detection system 105 may include a system that validates test cases. The data structure 110 may include one or more databases, tables, lists, and/or the like. Further details of the detection system 105 and the data structure 110 are provided elsewhere herein.

As shown by FIG. 1A, and reference number 115, the detection system 105 may receive network data in a format that includes packets generated based on a test case. For example, telecommunications network operators may conduct thousands of network element test cases on a daily basis. These test cases may help to maintain network operation, reliability, performance, and security. A test case may generate a PCAP file with packets that record intricate interactions between various network elements in a format that is human-readable. The network data may be generated based on interactions among multiple network elements during the test case, which may include various layers of protocols (e.g., transport protocol, application protocols, and/or the like), application actions and commands, and various parameters specific to each action of each protocol. The network data may be continuously stored in the data structure 110, may be periodically stored in the data structure 110, and/or the like. In some implementations, the detection system 105 may receive network data from the data structure 110. The detection system 105 may continuously receive the network data from the data structure 110, may periodically receive the network data from the data structure 110, may receive the network data from the data structure 110 based on providing a request for the network data to the data structure 110, and/or the like.

As further shown in FIG. 1A, and by reference number 120, the detection system 105 may utilize a generative artificial intelligence (AI) model to generate respective signatures that summarize the packets within a context of the test case. For example, the generative AI model may process the received network data and may extract features from the packets to form unique signatures for each packet. These signatures may summarize content and properties of the packets, and may facilitate further analysis by the detection system 105. Each signature generated by the generative AI model may include key attributes of a packet, such as a packet size (in bytes), source and destination IP addresses, port numbers, a protocol type, flags, control information, and payload content summaries. These features may be utilized to accurately characterize the packets and ensure effective anomaly detection.

In some implementations, the generative AI model may parse the network data to identify individual packets. The generative AI model may decode the packets to understand structures of the packets, which may include various layers, such as a transport layer and an application layer. For each packet, the generative AI model may extract relevant features that capture important characteristics of the packet. These features may include packet size, source and destination Internet protocol (IP) addresses and port numbers, a protocol type, flags and control information, payload content (e.g., header fields for application layer protocols), and/or the like. The detection system 105 may utilize the features for identifying and distinguishing different packets in terms of roles and behaviors within the network interactions. The generative AI model may utilize the extracted features to generate a concise representation or signature for each packet. A signature may encapsulate key attributes and behaviors of a packet. Depending on the implementation, the signature may be a vector of numerical values, a structured object, or even a short textual description summarizing a role and key contents of the packet.

To implement the generative AI model for generating signatures, the detection system 105 may utilize a machine learning model that is trained using a dataset of labeled PCAP files to recognize and extract features from the packets. The training process may include converting the PCAP files into a structured format suitable for training, such as a sequence of packet headers and payloads. This may involve parsing the PCAP files and extracting relevant fields, such as packet size, source and destination IP addresses, port numbers, protocol types, and payload content. The training process may include utilizing domain-specific knowledge to identify and extract key features from each packet. For example, important features may include packet length, header information, protocol-specific flags, and payload patterns. The training process may include training a deep learning model, such as a recurrent neural network (RNN) or a transformer model, to generate respective signatures that summarize the packets within a context of the test case, with labeled data indicating normal and anomalous packets. Once the model is trained, the generative AI model may be utilized to generate respective signatures for new packets. The signatures may encapsulate the key characteristics of the packets, represented as numerical vectors or structured objects.

In some implementations, the detection system 105 may further transform the signatures into embedded representations using techniques such as word embeddings or neural-network-based embeddings. This may ensure that the signatures are represented in a continuous vector space, facilitating similarity comparisons and clustering. In some implementations, the detection system 105 may employ summarization techniques, including generation of prompts that direct the generative AI model to focus on specific packet features. This directs the generative AI model to emphasize the most important features, ensuring that the signatures accurately reflect packet behavior while minimizing irrelevant details. As part of an iterative feedback loop, the detection system may continuously train and refine the generative AI model based on feedback from anomaly detection results and root cause analyses. This iterative process may ensure that the generative AI model adapts to new patterns and anomalies, improving accuracy and effectiveness over time. The generative AI model may include a transformer-based architecture that is pre-trained on a diverse corpus of network traffic data.

During the process of signature creation, the detection system 105 may flag any errors associated with generating the signatures. This may ensure that any packet that cannot be appropriately summarized or converted into a signature is promptly identified for further analysis, thereby maintaining the integrity and accuracy of the detection system 105. Errors flagged during this process may be stored in a distinct data structure for expert review and correction.

As shown in FIG. 1B, and by reference number 125, the detection system 105 may group the signatures based on protocols associated with the packets and to generate signature groups. For example, the detection system 105 may categorize the signatures generated from the packets according to protocols used by the packets. The protocols may include various types such as transport protocols and application protocols. By grouping the signatures according to these protocols, the detection system 105 may create organized sets of signatures, referred to as signature groups, that are specific to each protocol. The grouping may facilitate more efficient and targeted analysis of behaviors and characteristics of the packets within the context of the respective protocols of the packets.

Attempting to provide a large language model with a full PCAP for analysis is typically unsuccessful. This is due to a limitation of a token window versus a size of the PCAP file and an attention ability of the large language model to keep track from the beginning of the test case to the end of the test case, especially if there are hundreds of packets in between. In many cases, the large language model will hallucinate and produce unreliable results. The detection system 105 may improve the performance of the large language model by generating signatures from the packets, as described above in connection with FIG. 1A. In order to accommodate the limited token window allowed by the large language model and to address the limited attention between the beginning of the test case and the end of the test case, the detection system 105 may group the signatures based on the protocols associated with the packets and to generate the signature groups. In this way, each protocol may be analyzed independently by the large language model, so that the large language model may understand a flow of each protocol and determine whether any errors are detected for that protocol.

In some implementations, the detection system 105 may group the signatures using a hierarchical clustering model based on the protocol type and packet attributes. For example, packets associated with different protocols may be categorized separately and, within each protocol, further sub-grouping may be performed based on source and destination IPs and ports. Each group may then be analyzed using statistical models to detect outliers and patterns indicative of anomalies.

Figure 1C:
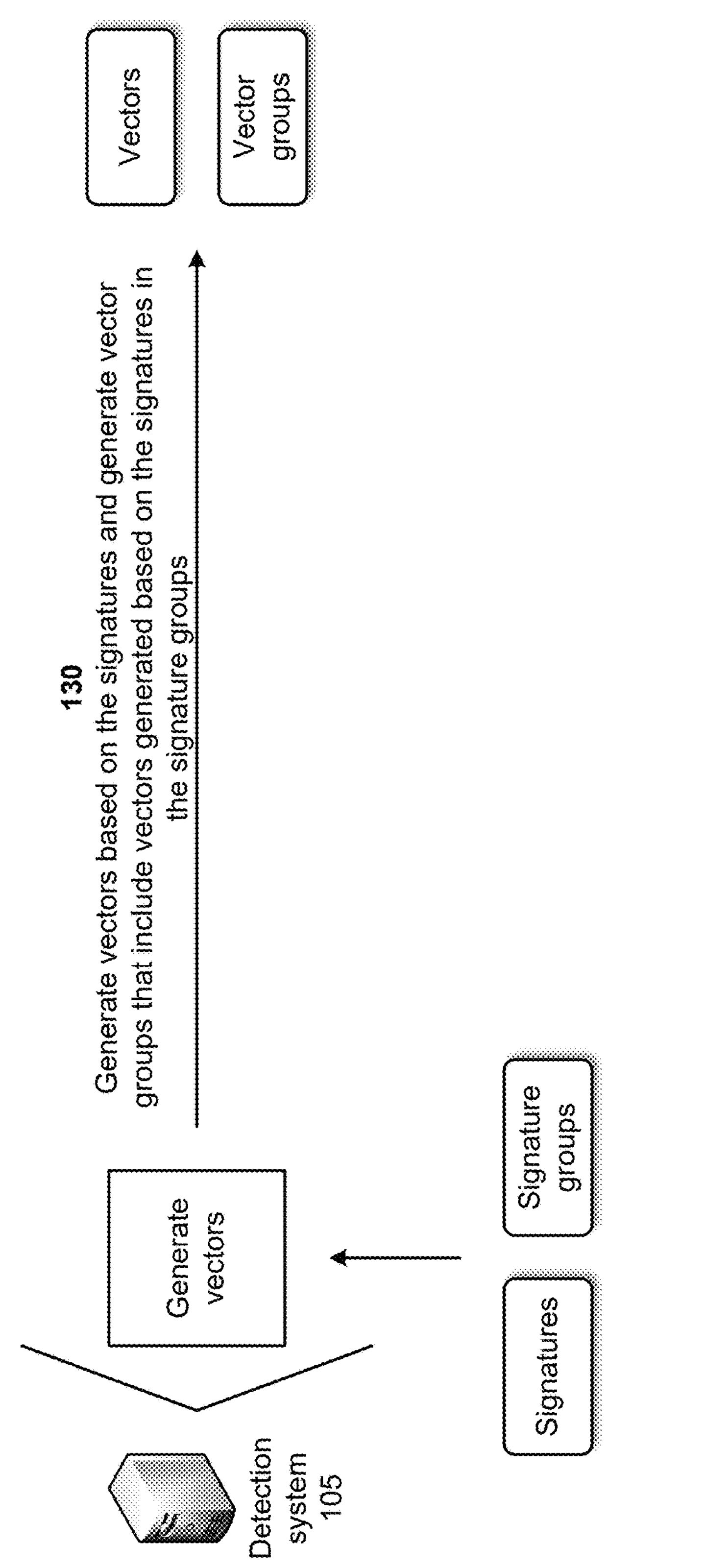

As shown in FIG. 1C, and by reference number 130, the detection system 105 may generate vectors based on the signatures and may generate vector groups that include vectors generated based on the signatures in the signature groups. For example, the detection system 105 may categorize and transform the signatures into numerical representations, or vectors, that facilitate further processing by the detection system 105. The vectors may encapsulate various features of the packets, as derived from the signatures, and may be organized into vector groups corresponding to the protocol-specific signature groups. The organization into vector groups may enable more efficient and structured analysis by the detection system 105. For the vector generation, techniques such as Word2Vec and bidirectional encoder representations from transformers (BERT) embeddings may be applied to convert packet signatures into numerical representations.

In some implementations, the detection system 105 may generate numerical representations based on the signatures and may organize the numerical representations into protocol-specific groups. The numerical representations may enable the detection system 105 to systematically analyze different protocols by grouping similar data points. Additionally, or alternatively, the detection system 105 may transform the signatures into vectors and may categorize the vectors into vector groups corresponding to the different protocols. This may permit the detection system 105 to filter and segment data for more precise analysis. For example, by converting the signatures to numerical vectors, the detection system 105 may apply quantitative techniques for effective anomaly detection. Additionally, or alternatively, the detection system 105 may utilize embeddings to convert the signatures into the vectors, and may then group the vectors by protocol for anomaly detection. The embeddings may encode relevant features of the signatures, promoting efficient grouping and analysis. In some implementations, the vectors may be generated using techniques such as word embeddings or neural-network-based embeddings, which convert the signatures into a continuous vector space. This transformation may ensure that the vectors retain meaningful relationships and similarities among the packets. The detection system 105 may then cluster these vectors into vector groups based on the protocol-specific signatures, allowing for targeted analysis of each protocol within the test case. The detection system 105 may utilize word embeddings or neural-network-based embeddings to convert the signatures into continuous vector spaces. The vectors may encapsulate relevant features of the packets, promoting efficient grouping and analysis. The embeddings may include meaningful relationships and similarities among the packets, enabling the detection system 105 to systematically analyze different protocols by grouping similar data points. This may enhance the accuracy and reliability of anomaly detection by providing a structured and quantifiable representation of packet behaviors.

Figure 1D:
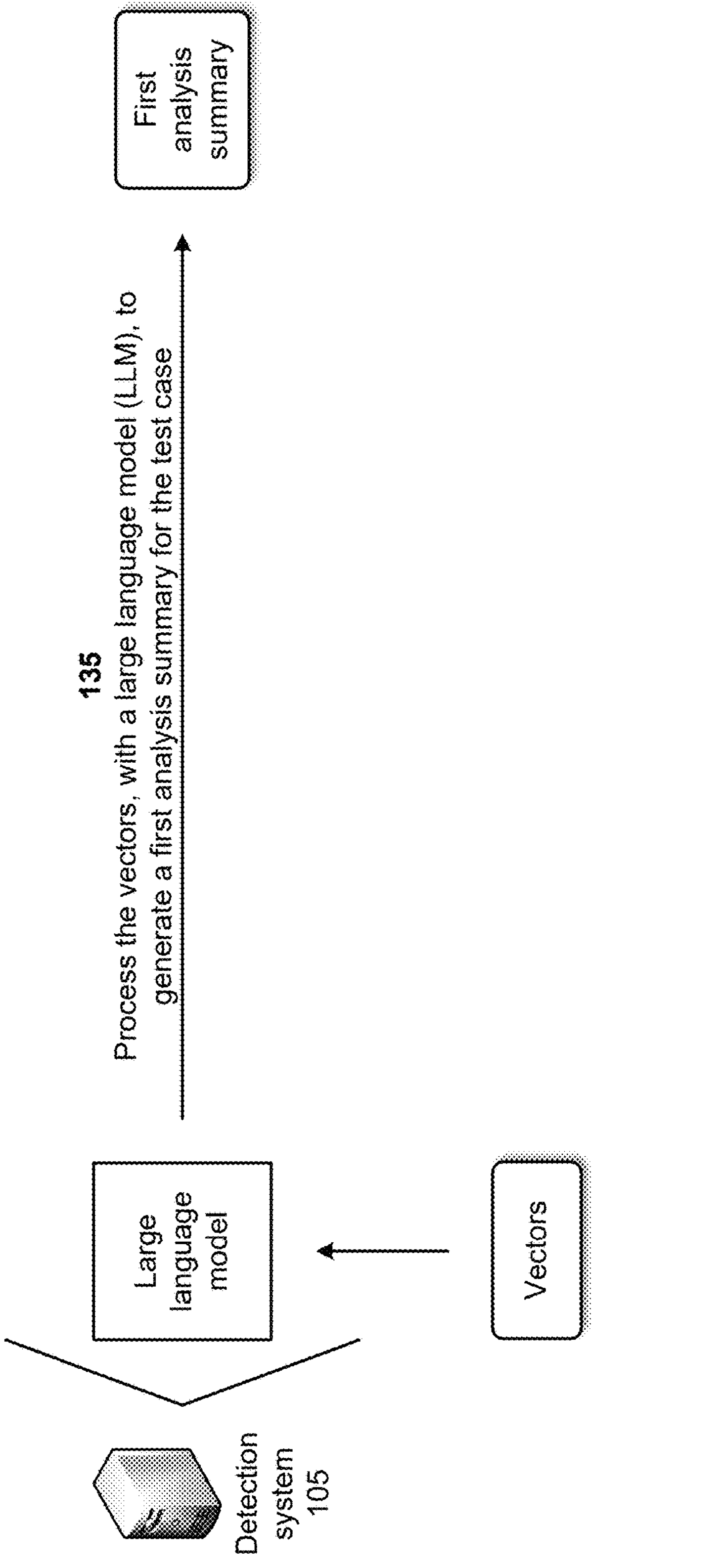

As shown in FIG. 1D, and by reference number 135, the detection system 105 may process the vectors, with a large language model (LLM), to generate a first analysis summary for the test case. For example, the detection system 105 may utilize the LLM to interpret and analyze the vectors derived from the packet signatures. The LLM may process each vector to identify patterns, anomalies, and significant features that contribute to the overall network behavior during the test case. Based on this, the LLM may generate a comprehensive summary that includes the key findings and insights from the vector analysis. This first analysis summary may serve as an initial report on the test case, highlighting any detected anomalies in the test case (e.g., associated with behaviors of one or more network elements) and providing a basis for further investigation.

In some implementations, the LLM may include a generative AI model that generates the first analysis summary for the test case. For example, the generative AI model may apply advanced techniques to extract meaningful information from the signatures, and may generate a detailed report. Additionally, or alternatively, the detection system 105 may utilize a machine learning model to interpret and analyze the vectors derived from the signatures. For example, the machine learning model may employ classification and clustering methods to discern patterns and anomalies within the vectors. Additionally, or alternatively, the detection system 105 may utilize a deep learning model to process the vectors and generate the first analysis summary for the test case. The deep learning model may utilize a neural network architecture to learn complex representations from the vector data, thereby identifying features influencing network behavior.

Figure 1E:
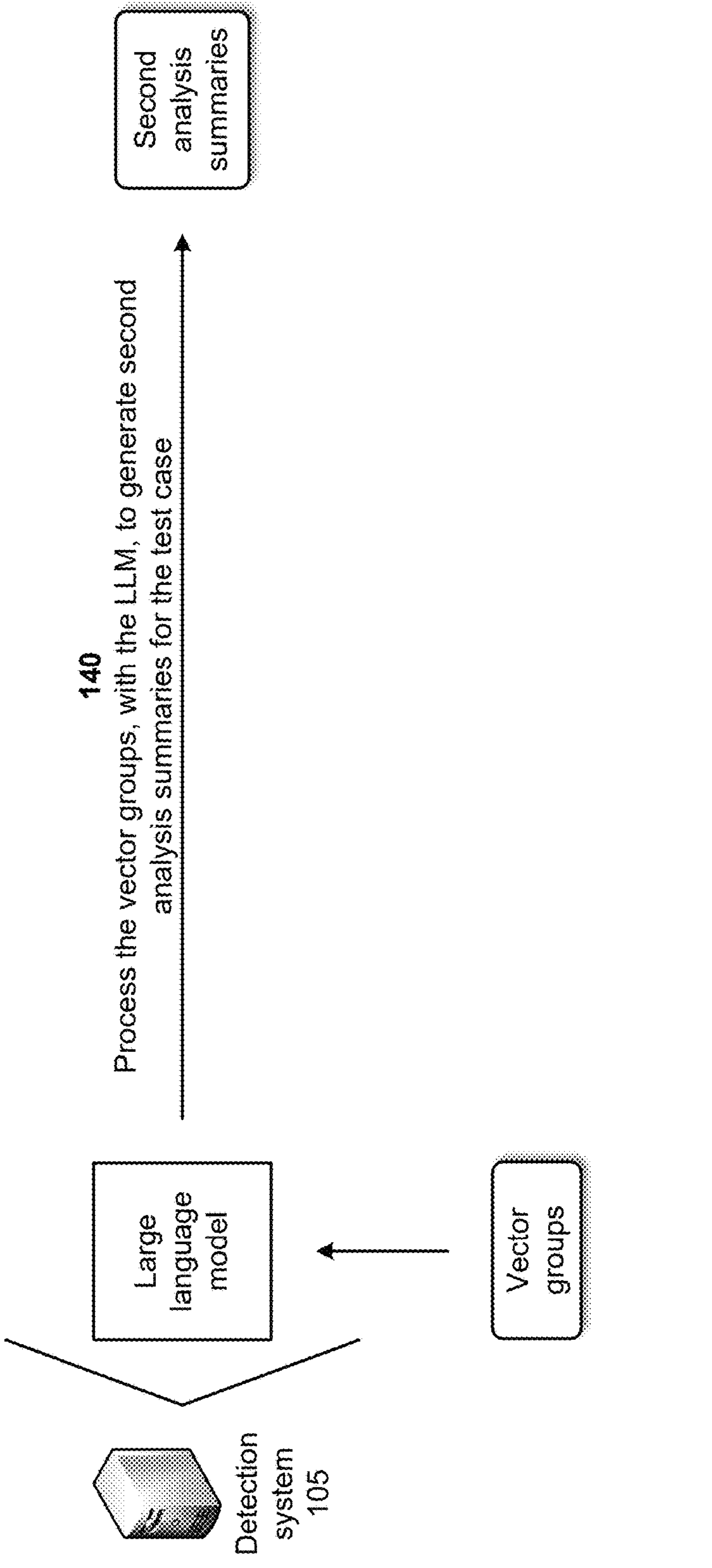

As shown in FIG. 1E, and by reference number 140, the detection system 105 may process the vector groups, with the LLM, to generate second analysis summaries for the test case. For example, the detection system 105 may utilize the LLM to interpret and analyze the vectors organized into the vector groups. The LLM may process each vector group independently to identify patterns, anomalies, and significant features that contribute to the overall network behavior, for each of the protocols, during the test case. By doing so, the LLM may generate detailed second analysis summaries that include the key findings and insights from the vector group analysis. These second analysis summaries may provide a comprehensive understanding of the behaviors and potential issues within the test case, segmented by the protocol-specific vector groups.

In some implementations, the detection system 105 may analyze the vector groups using the LLM to generate detailed reports for the test case. The LLM may generate such reports by examining the content and structure of the signatures or signature group to determine specific attributes and behaviors. Additionally, or alternatively, the LLM may synthesize information from each protocol-specific vector group to highlight relevant patterns and issues specific to each protocol.

In some implementations, the LLM may include a generative AI model that generates the second analysis summaries for the test case. For example, the generative AI model may apply advanced techniques to extract meaningful information from the vectors of each vector group, and may generate detailed reports. Additionally, or alternatively, the detection system 105 may utilize a machine learning model to interpret and analyze the vectors of each vector group. For example, the machine learning model may employ classification and clustering methods to discern patterns and anomalies within the vectors of each vector group. Additionally, or alternatively, the detection system 105 may utilize a deep learning model to process the vectors of each vector group and generate the second analysis summaries for the test case. The deep learning model may utilize a neural network architecture to learn complex representations from the vector data, thereby identifying features for each protocol that influence network behavior.

Figure 1F:
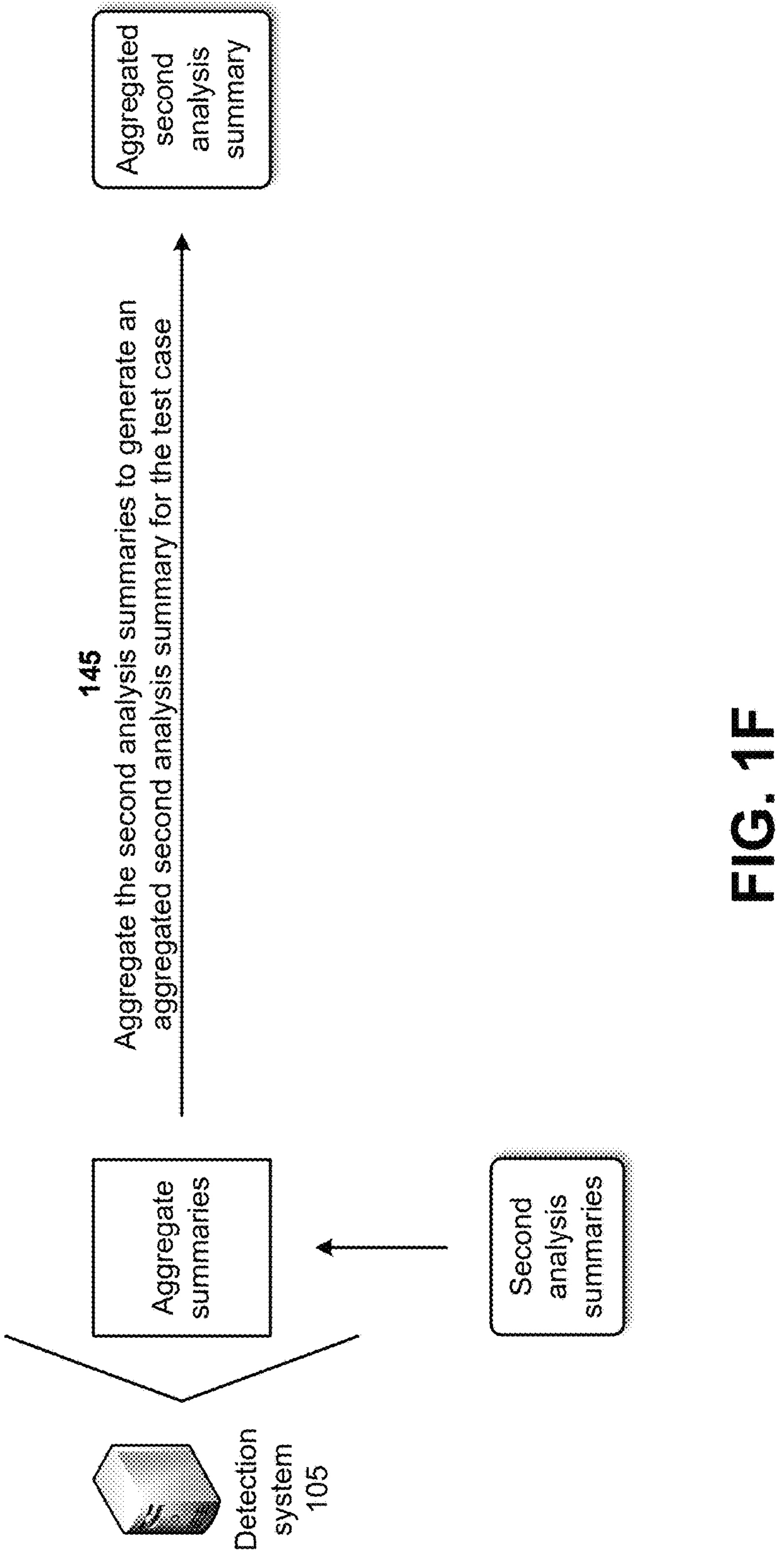

As shown in FIG. 1F, and by reference number 145, the detection system 105 may aggregate the second analysis summaries to generate an aggregated second analysis summary for the test case. For example, the detection system 105 may consolidate the detailed second analysis summaries, which provide insights and findings from analyzing protocol-specific vector groups, into the comprehensive aggregated second analysis summary. The aggregated second analysis summary may provide an overall assessment of the test case, taking into account the independent analyses of each protocol-specific vector group. The aggregated second analysis summary may enable the detection system 105 to detect anomalies and evaluate network interactions recorded in the test case.

In some implementations, the detection system 105 may store the aggregated second analysis summary in a data structure (e.g., a database, a table, a list, and/or the like) for future reference. For example, the detection system 105 may utilize a cloud-based storage service to store the aggregated second analysis summary for long-term trend analysis. This may enable the detection system 105 to compare and analyze data from past test cases to identify patterns and predict potential issues in the network. Additionally, or alternatively, the detection system 105 may integrate the aggregated second analysis summary into a context-aware diagnostics tool. For example, the detection system 105 may convert the aggregated second analysis summary into a format that enables the context-aware diagnostics tool to prompt technicians with actionable steps.

Figure 1G:
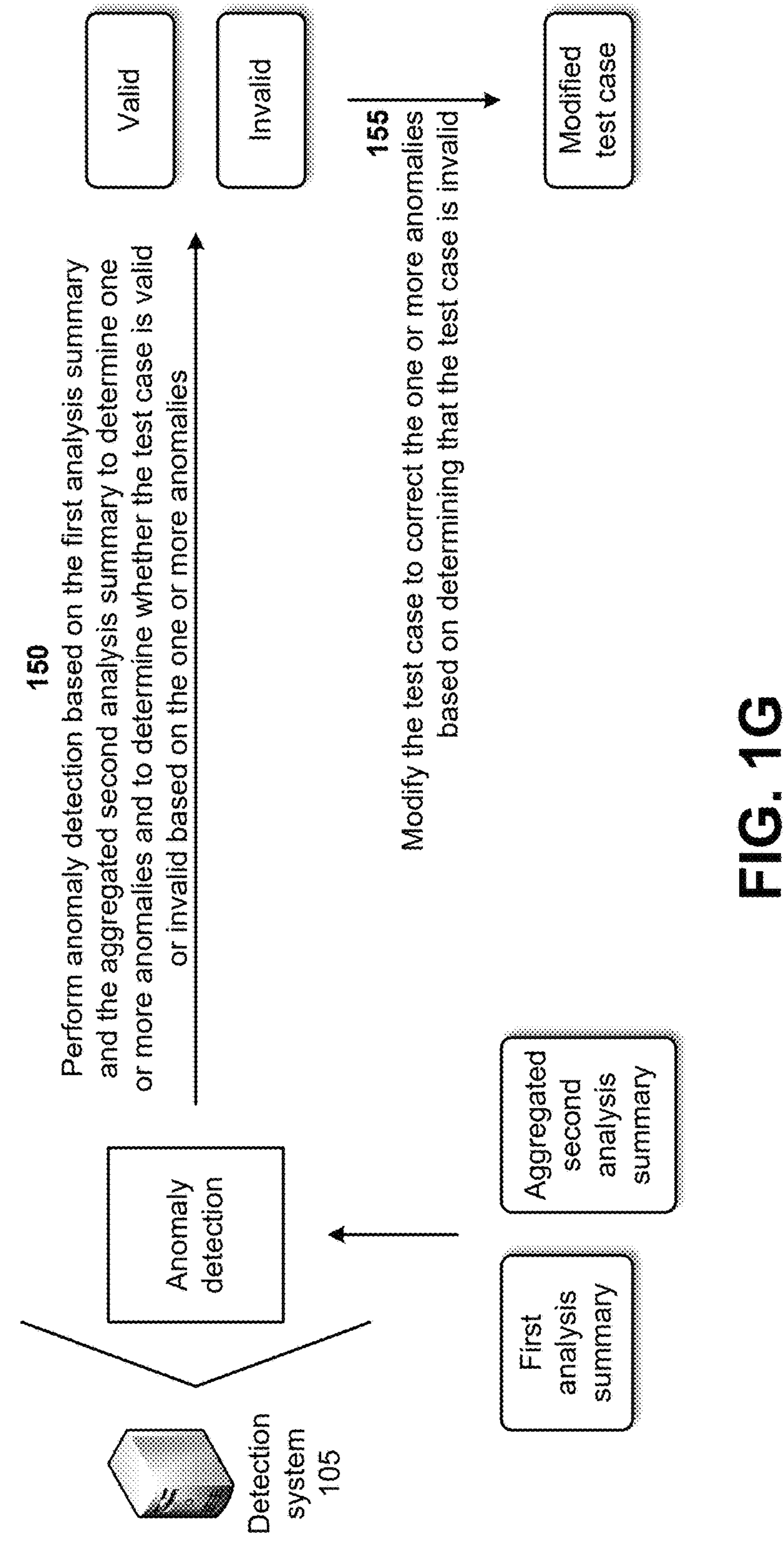

As shown by FIG. 1G, and by reference number 150, the detection system 105 may perform anomaly detection based on the first analysis summary and the aggregated second analysis summary to determine anomalies and to determine whether the test case is valid or invalid based on the anomalies. For example, the detection system 105 may analyze the first analysis summary and the aggregated second analysis summary to identify discrepancies or unusual patterns that indicate potential issues or anomalies in the network interactions recorded during the test case. The detection system 105 may utilize predefined criteria or machine learning models to assess the validity of the test case based on the detected anomalies. If the anomalies indicate significant issues, the detection system 105 may determine that the test case is invalid. Alternatively, if there are few anomalies or the anomalies fail to indicate significant issues, the detection system 105 may determine that the test is valid. In some implementations, the detection system 105 may analyze the signatures within each protocol-specific group separately, identifying anomalies specific to each protocol group. This may enable more precise anomaly detection tailored to characteristics of each protocol. In some implementations, the detection system 105 may apply a statistical model or a machine learning model to the vectors to identify patterns that deviate from expected norms, indicating anomalies. This may improve the accuracy and reliability of the anomaly detection process.

To analyze the protocol-specific signature groups for anomaly detection, the detection system 105 may apply clustering models (e.g., a k-means model) to group similar signatures and identify patterns within each protocol-specific group, and may utilize classification models (e.g., decision trees, support vector machines, and/or the like) to distinguish between normal and anomalous patterns. The detection system 105 may develop an anomaly detection model that leverages clustered and classified signature groups. The model may compare the current protocol-specific signatures against historical data to detect deviations indicating potential anomalies. The detection system 105 may aggregate the results from the independent analysis of each protocol-specific signature group to form a comprehensive view of the test case. This may include combining the detected anomalies and assessing their overall impact on the network interactions recorded during the test case. The anomaly detection may employ a combination of supervised machine learning models, such as random forest classifiers, and unsupervised models, such as k-means clustering, to identify deviations from expected network behavior.

As further shown in FIG. 1G, and by reference number 155, the detection system 105 may modify the test case to correct the anomalies based on determining that the test case is invalid. For example, upon determining that the test case is invalid, the detection system 105 may implement corrective actions to address the identified anomalies. The corrective actions may include adjusting parameters, reconfiguring network elements, or modifying test cases to eliminate the anomalies and ensure the accuracy and reliability of future test cases.

Additionally, or alternatively, modifying the test case may include the detection system 105 generating prompts that direct the generative AI model to extract features from the packets when forming the signatures. For example, the detection system 105 may create and send specific instructions to the generative AI model to focus on certain packet attributes, such as header information or payload content, when generating signatures. This may ensure that the generated signatures capture relevant and meaningful features for accurate anomaly analysis. Additionally, or alternatively, modifying the test case may include the detection system 105 utilizing machine learning models tailored to characteristics of the protocols to analyze each of the protocol-specific signature groups independently. For example, specialized machine learning models may be applied to protocol-specific groups to detect anomalies that are unique to each protocol type. This may enhance an ability of the detection system 105 to identify protocol-specific issues.

Figure 1H:
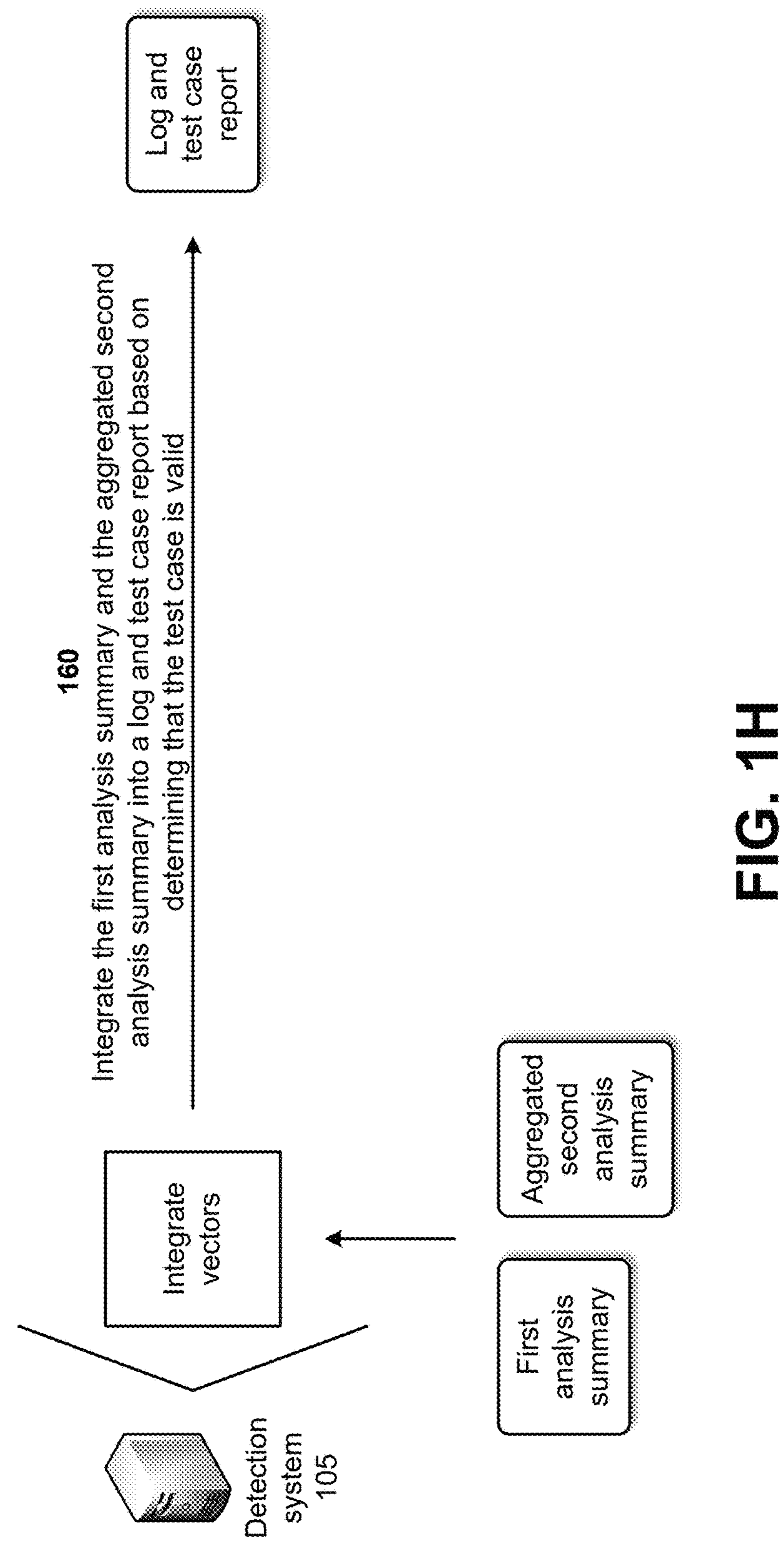

As shown in FIG. 1H, and by reference number 160, the detection system 105 may integrate the first analysis summary and the aggregated second analysis summary into a log and test case report based on determining that the test case is valid. For example, after determining that the test case is valid, the detection system 105 may combine the insights and findings from the first analysis summary and the aggregated second analysis summary into a comprehensive document referred to as the log and test report. The log and test case report may include summaries of network behaviors, identified anomalies, and overall test case results. In some implementations, the log and test case report may be formatted to provide a clear and organized presentation of the data, facilitating review and action by network operators and other stakeholders. Merging the first analysis summary and the aggregated second analysis summary into a unified report may enable a seamless correlation of initial and detailed analyses, which assists in pinpointing specific issues efficiently. The log and test report may include detailed sections that break down each phase of the analysis, aiding in a thorough root cause analysis, as described below.

Figure 1I:
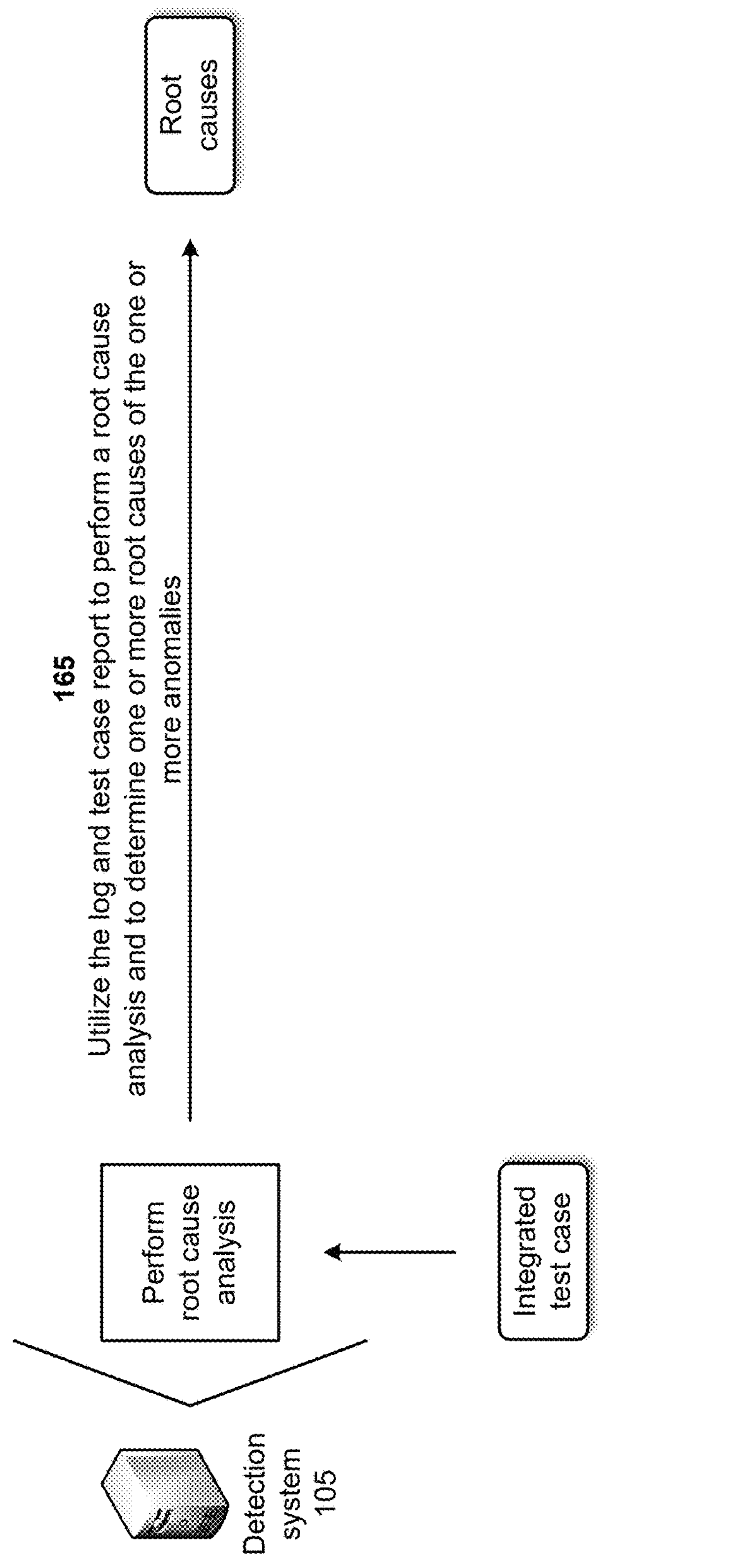

As shown in FIG. 1I, and by reference number 165, the detection system 105 may utilize the log and test case report to perform a root cause analysis and to determine one or more root causes of the one or more anomalies. For example, the detection system 105 may analyze the integrated test case data provided in the log and test case report to identify patterns or sequences of events that lead to the one or more anomalies detected during the test case. This process may include examining detailed summaries and aggregated results to pinpoint specific issues within the network interactions. The root cause analysis may reveal underlying problems in network configurations, protocol implementations, or other implementations of the test case environment that contributed to the one or more anomalies. The root cause analysis may aid in understanding fundamental reasons behind the one or more anomalies, enabling targeted corrective actions.

Additionally, or alternatively, performing the root cause analysis may include the detection system 105 utilizing machine learning models to classify the one or more anomalies and suggest potential fixes based on historical data. For example, the detection system 105 may analyze the one or more anomalies by leveraging historical data-driven insights to recommend specific actions that could resolve the detected issues effectively. Additionally, or alternatively, performing the root cause analysis may include the detection system 105 aggregating results into comprehensive visualizations to aid in identifying trends and patterns contributing to the one or more anomalies. The visualizations may aid network administrators in quickly discerning patterns or repetitive issues within the network configurations or protocol implementations. Additionally, or alternatively, the detection system 105 may compare current test case anomalies with past data to identify recurring issues and predict future network problems. This comparison may provide for proactive maintenance by signaling potential future anomalies before the one or more anomalies occur.

Additionally, or alternatively, the detection system 105 may integrate feedback loops to continually refine the anomaly detection and root cause analysis processes based on new data. Such feedback loops may enhance the accuracy of the detection system 105 over time by incorporating outcomes of previously implemented corrective actions into the anomaly detection and analysis techniques. Additionally, or alternatively, the detection system 105 may collaborate with external systems to cross-reference test case data and verify the root causes of anomalies. By doing so, the detection system 105 may enhance the reliability of the analysis and confirm the origin of detected issues through additional data sources. Additionally, or alternatively, the detection system 105 may store detailed logs of the root cause analysis for future reference and continuous improvement of network monitoring. These logs may provide valuable data points for ongoing analysis and optimization efforts.

Additionally, or alternatively, the detection system 105 may integrate with network management tools to automatically apply corrective actions identified during the root cause analysis. This integration may enhance operational efficiency by reducing the response time to detected anomalies. Additionally, or alternatively, the detection system 105 may use anomaly detection to prioritize issues based on their impact on network performance and reliability. Such prioritization may ensure that the most critical issues are addressed first.

Figure 1J:
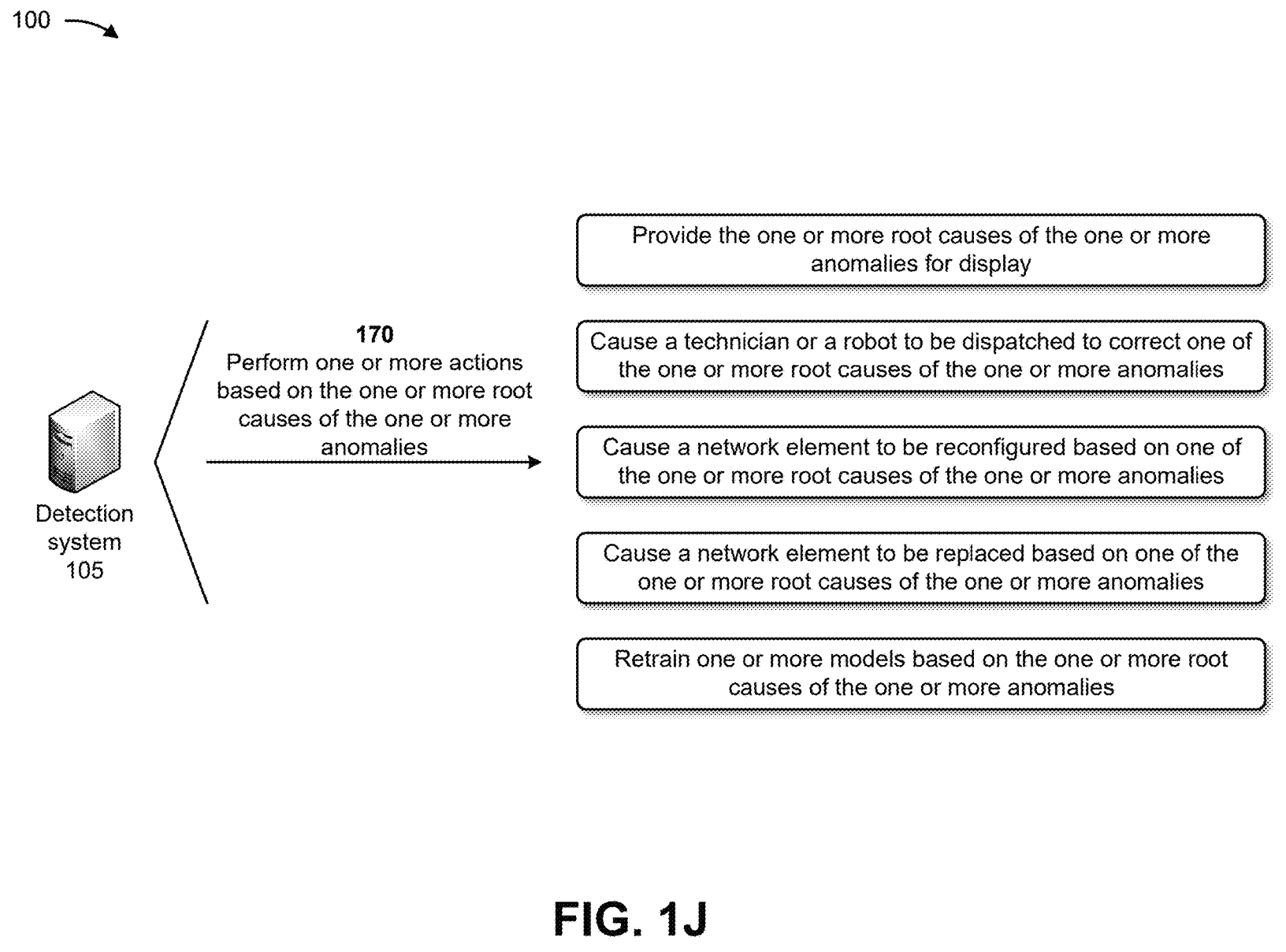

As shown in FIG. 1J, and by reference number 170, the detection system 105 may perform one or more actions based on the one or more root causes of the one or more anomalies. In some implementations, performing the one or more actions includes the detection system 105 providing the one or more root causes of the one or more anomalies for display. For example, the detection system 105 may provide the one or more root causes of the one or more anomalies to a user device associated with a network administrator, and the user device may display the one or more root causes of the one or more anomalies to the network administrator. Additionally, or alternatively, the detection system 105 may provide a user-friendly interface for network administrators to review root cause analysis findings and implement recommended actions. This interface may streamline the workflow for network administrators and expedite the decision-making process. In this way, the detection system 105 may conserve computing resources associated with failing to identify and address network issues based on the erroneous test case results.

In some implementations, performing the one or more actions includes the detection system 105 causing a technician or a robot to be dispatched to correct one of the one or more root causes of the one or more anomalies. For example, the detection system 105 may generate an instruction to correct the one of the one or more root causes of the one or more anomalies, and may provide the instruction to a user device of a technician or to a robot. The technician or the robot may follow the instruction to correct the one of the one or more root causes of the one or more anomalies in the network. In this way, the detection system 105 may conserve computing resources associated with failing to identify and address network issues based on the erroneous test case results.

In some implementations, performing the one or more actions includes the detection system 105 causing a network element to be reconfigured based on one of the one or more root causes of the one or more anomalies. For example, the detection system 105 may identify a network element associated with the one of the one or more root causes of the one or more anomalies, and may determine that the network element needs to be reconfigured to correct the one of the one or more root causes of the one or more anomalies. The detection system 105 may provide a reconfiguration to the network element, and the network element may be reconfigured based on the reconfiguration and to correct the one of the one or more root causes of the one or more anomalies. In this way, the detection system 105 may conserve computing resources associated with failing to identify and address network issues based on the erroneous test case results.

In some implementations, performing the one or more actions includes the detection system 105 causing a network element to be replaced based on one of the one or more root causes of the one or more anomalies. For example, the detection system 105 may identify a network element associated with the one of the one or more root causes of the one or more anomalies, and may determine that the network element needs to be replaced to correct the one of the one or more root causes of the one or more anomalies. The detection system 105 may order a new network element to replace the network element and may cause the network element to be replaced with the new network element. In this way, the detection system 105 may conserve computing resources associated with failing to identify and address network issues based on the erroneous test case results.

In some implementations, performing the one or more actions includes the detection system 105 retraining one or more models (e.g., the generative artificial intelligence model, the large language model, and/or the like) based on the one or more root causes of the one or more anomalies. For example, the detection system 105 may utilize the one or more root causes of the one or more anomalies as additional training data for retraining the one or more models, thereby increasing the quantity of training data available for training the one or more models. Accordingly, the detection system 105 may conserve computing resources associated with failing to properly convert packets to signatures, generating erroneous test case results based on failing to properly convert the packets to signatures, failing to identify and address network issues based on the erroneous test case results, and/or the like.

In this way, the detection system 105 validates test cases. For example, the detection system 105 may simplify and automate the process of analyzing network test cases to determine pass or fail statuses. The detection system 105 may utilize a generative artificial intelligence model to generate and group signatures for packets based on a test case. The detection system 105 may group the signatures according to associated protocols, resulting in protocol-specific signature groups. The detection system 105 may conduct an independent analysis of each protocol-specific signature group to detect anomalies within the test case, and may compile analysis results to ascertain an overall result for the test case. Thus, the detection system 105 may conserve computing resources, networking resources, and/or other resources that would have otherwise been consumed by failing to properly convert packets to signatures, generating erroneous test case results based on failing to properly convert the packets to signatures, failing to identify and address network issues based on the erroneous test case results, and/or the like.

As indicated above, FIGS. 1A-1J are provided as an example. Other examples may differ from what is described with regard to FIGS. 1A-1J. The number and arrangement of devices shown in FIGS. 1A-1J are provided as an example. In practice, there may be additional devices, fewer devices, different devices, or differently arranged devices than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) shown in FIGS. 1A-1J may perform one or more functions described as being performed by another set of devices shown in FIGS. 1A-1J.

Figure 2:
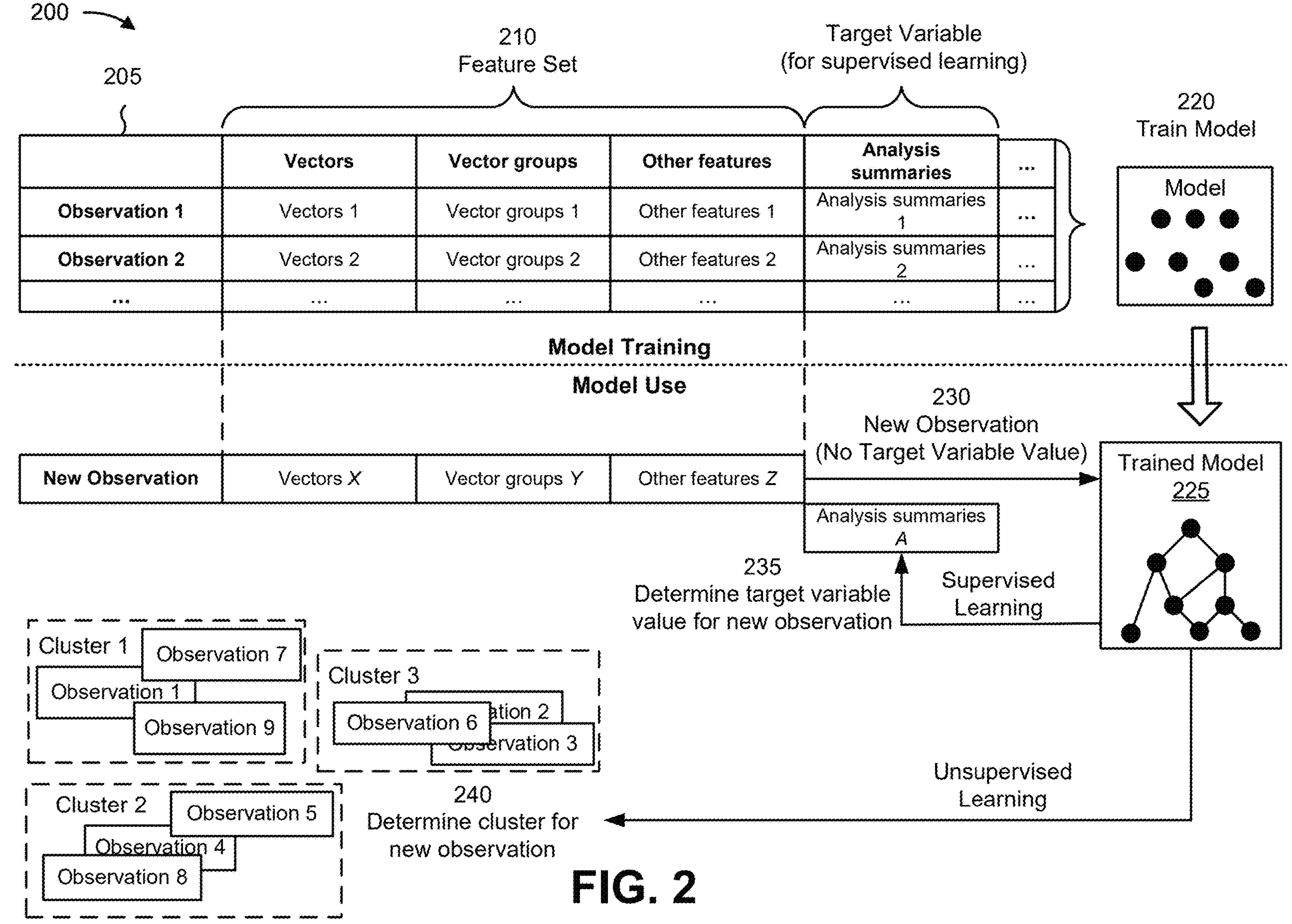
FIG. 2 is a diagram illustrating an example of training and using a machine learning model.

FIG. 2 is a diagram illustrating an example 200 of training and using a machine learning model. The machine learning model training and usage described herein may be performed using a machine learning system. The machine learning system may include or may be included in a computing device, a server, a cloud computing environment, or the like, such as the detection system 105.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the detection system 105, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the detection system 105. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of vectors, a second feature of vector groups, a third feature of other features, and so on. As shown, for a first observation, the first feature may have a value of vectors 1, the second feature may have a value of vector groups 1, the third feature may have a value of other features 1, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is analysis summaries, which has a value of analysis summaries 1 for the first observation. The feature set and target variable described above are provided as examples, and other examples may differ from what is described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of vectors X, a second feature of vector groups Y, a third feature of other features Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of analysis summaries A for the target variable of analysis summaries for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a vector cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a vector groups cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model).

In this way, the machine learning system may apply a rigorous and automated process to validate test cases. The machine learning system may enable recognition and/or identification of tens, hundreds, thousands, or millions of features and/or feature values for tens, hundreds, thousands, or millions of observations, thereby increasing accuracy and consistency and reducing delay associated with validating test cases relative to requiring computing resources to be allocated for tens, hundreds, or thousands of operators to manually validate test cases.

As indicated above, FIG. 2 is provided as an example. Other examples may differ from what is described in connection with FIG. 2.

Figure 3:
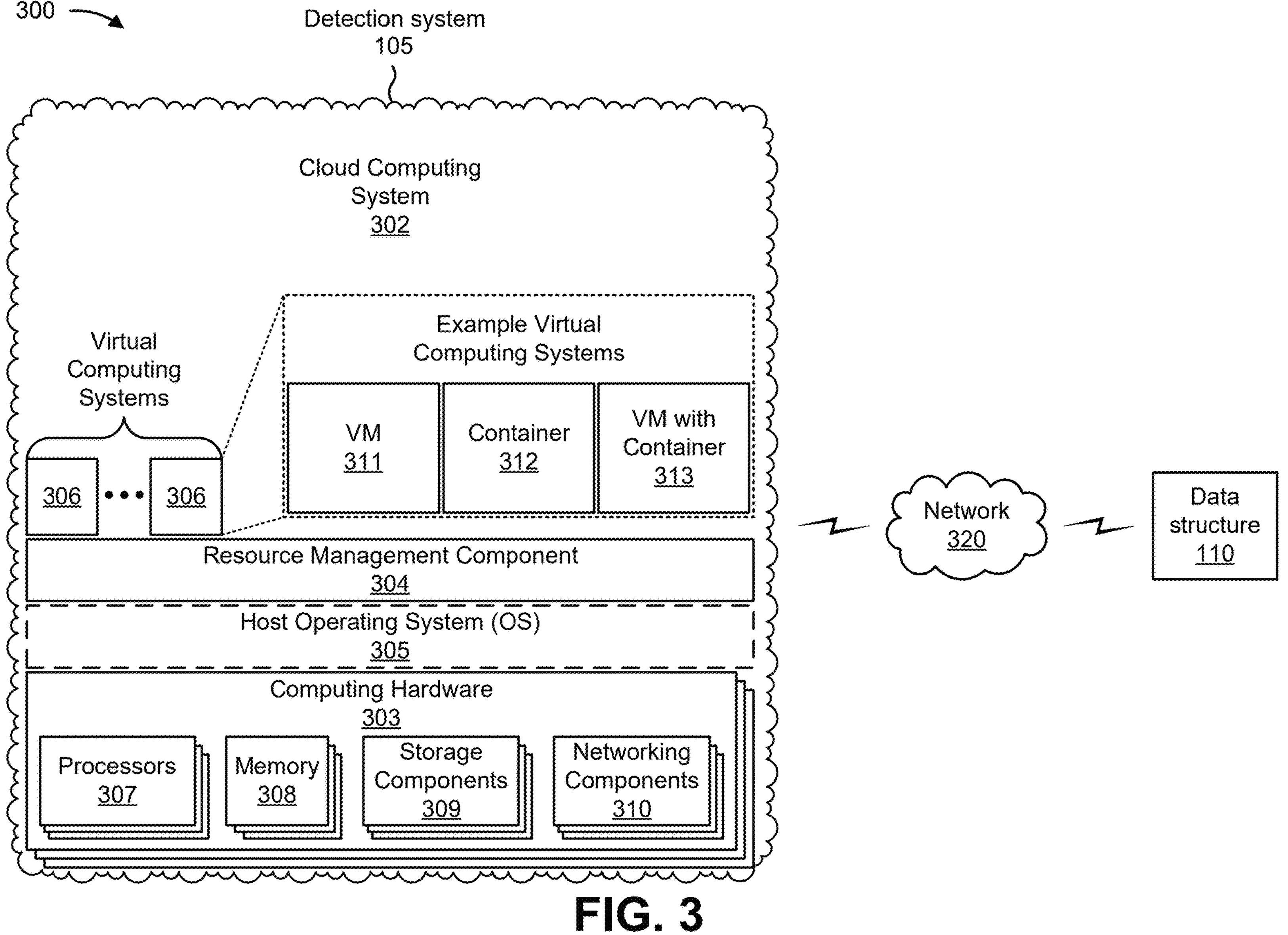
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the detection system 105, which may include one or more elements of and/or may execute within a cloud computing system 302. The cloud computing system 302 may include one or more elements 303-313, as described in more detail below. As further shown in FIG. 3, the environment 300 may include the data structure 110 and/or a network 320. Devices and/or elements of the environment 300 may interconnect via wired connections and/or wireless connections.

The data structure 110 may include one or more devices capable of receiving, generating, storing, processing, and/or providing information, as described elsewhere herein. The data structure 110 may include a communication device and/or a computing device. For example, the data structure 110 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 110 may communicate with one or more other devices of environment 300, as described elsewhere herein.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the detection system 105 may include one or more elements 303-313 of the cloud computing system 302, may execute within the cloud computing system 302, and/or may be hosted within the cloud computing system 302, in some implementations, the detection system 105 may not be cloud-based (e.g., may be implemented outside of a cloud computing system) or may be partially cloud-based. For example, the detection system 105 may include one or more devices that are not part of the cloud computing system 302, such as a device 400 of FIG. 4, which may include a standalone server or another type of computing device. The detection system 105 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
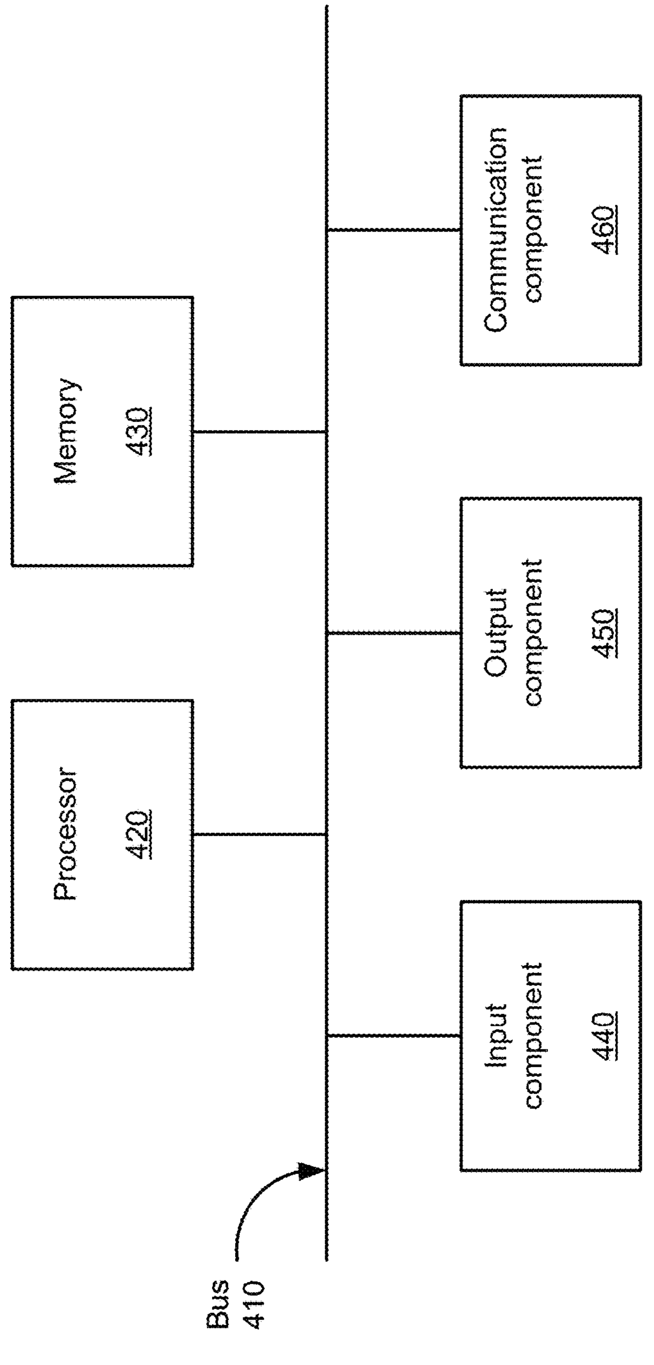
FIG. 4 is a diagram of example components of one or more devices of FIG. 3.

FIG. 4 is a diagram of example components of a device 400, which may correspond to the detection system 105 and/or the data structure 110. In some implementations, the detection system 105 and/or the data structure 110 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
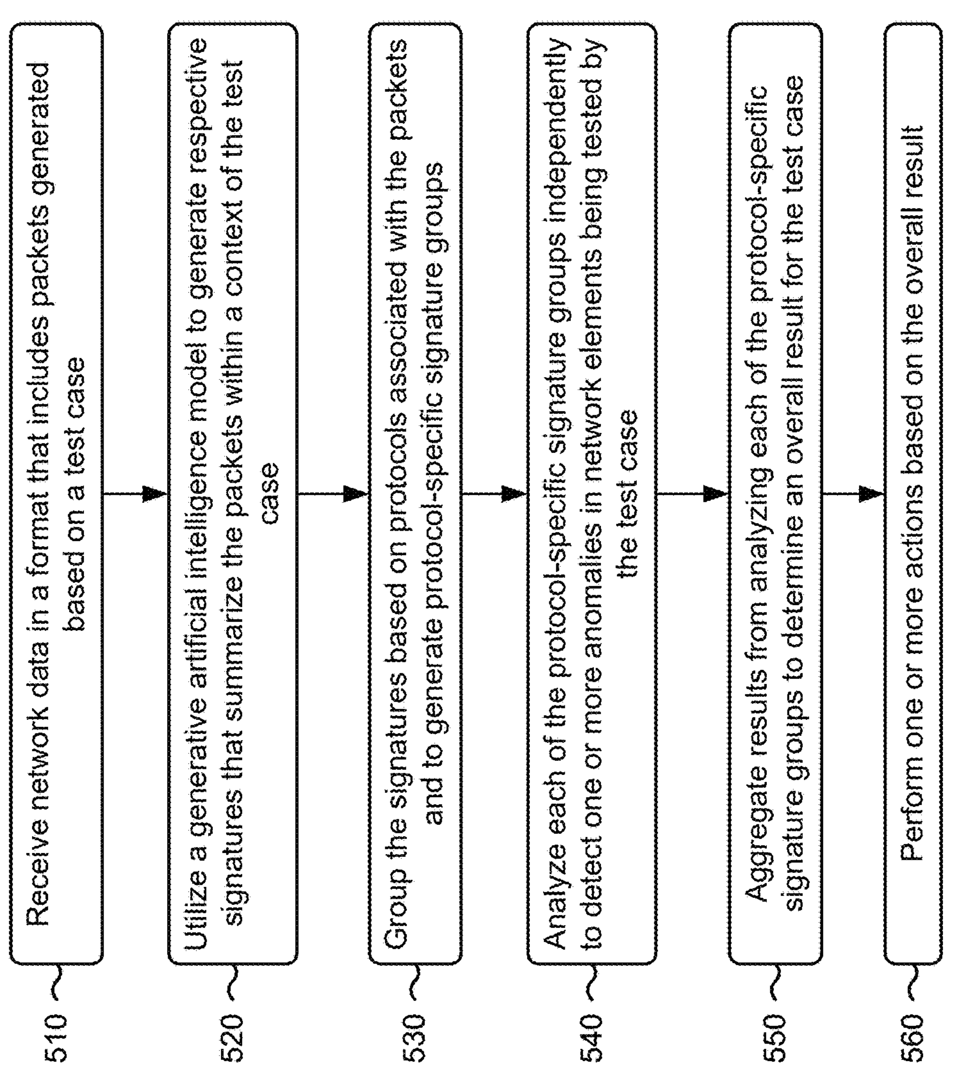
FIG. 5 is a flowchart of an example process for validating test cases.

FIG. 5 depicts a flowchart of an example process 500 for validating test cases. In some implementations, one or more process blocks of FIG. 5 may be performed by a device (e.g., the detection system 105). In some implementations, one or more process blocks of FIG. 5 may be performed by another device or a group of devices separate from or including the device. Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving network data in a format that includes packets generated based on a test case (block 510). For example, the device may receive network data in a format that includes packets generated based on a test case, as described above. In some implementations, the network data is generated based on network interactions by multiple network elements during the test case.

As further shown in FIG. 5, process 500 may include utilizing a generative artificial intelligence model to generate respective signatures that summarize the packets within a context of the test case (block 520). For example, the device may utilize a generative artificial intelligence model to generate respective signatures that summarize the packets within a context of the test case, as described above. In some implementations, the generative artificial intelligence model generates a summary for each packet to form the signature for each packet. In some implementations, utilizing the generative artificial intelligence model to generate the signatures for the packets includes generating prompts that direct the generative artificial intelligence model to extract features from the packets to form the signatures.

As further shown in FIG. 5, process 500 may include grouping the signatures based on protocols associated with the packets and to generate protocol-specific signature groups (block 530). For example, the device may group the signatures based on protocols associated with the packets and to generate protocol-specific signature groups, as described above. In some implementations, the protocols include transport protocols and application protocols.

As further shown in FIG. 5, process 500 may include analyzing each of the protocol-specific signature groups independently to detect one or more anomalies in network elements being tested by the test case (block 540). For example, the device may analyze each of the protocol-specific signature groups independently to detect one or more anomalies in network elements being tested by the test case, as described above. In some implementations, analyzing each of the protocol-specific signature groups includes performing an anomaly detection using the vectors, generated for the signatures in each of the protocol-specific signature groups, to detect the one or more one or more anomalies in the network elements being tested by the test case. In some implementations, analyzing each of the protocol-specific signature groups independently to detect the one or more anomalies in the network elements being tested by the test case includes utilizing a machine learning model to classify the protocol-specific signature groups and detect the one or more anomalies in the network elements being tested by the test case. In some implementations, analyzing each of the protocol-specific signature groups independently to detect the one or more anomalies in the network elements being tested by the test case includes utilizing machine learning models, tailored to characteristics of the protocols, to analyze each of the protocol-specific signature groups independently and to detect the one or more anomalies in the network elements being tested by the test case.

As further shown in FIG. 5, process 500 may include aggregating results from analyzing each of the protocol-specific signature groups to determine an overall result for the test case (block 550). For example, the device may aggregate results from analyzing each of the protocol-specific signature groups to determine an overall result for the test case, as described above. In some implementations, aggregating the results from analyzing each of the protocol-specific signature groups includes combining the results from analyzing each of the protocol-specific signature groups to generate a comprehensive analysis of the test case.

As further shown in FIG. 5, process 500 may include performing one or more actions based on the overall result (block 560). For example, the device may perform one or more actions based on the overall result, as described above. In some implementations, performing the one or more actions based on the overall result includes one or more of providing the overall result for display, causing a technician or a robot to be dispatched to service a network element based on the overall result, causing a network element to be reconfigured based on the overall result, causing a network element to be replaced based on the overall result, or retraining the generative artificial intelligence model based on the overall result.

In some implementations, process 500 includes generating vectors for the signatures in each of the protocol-specific signature groups prior to analyzing each of the protocol-specific signature groups. In some implementations, process 500 includes integrating the overall result into a log and test case report. In some implementations, process 500 includes performing a root cause analysis based on the log and test case report to determine root causes of the one or more anomalies in the network elements being tested by the test case.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a device, network data in a format that includes packets generated based on a test case;

utilizing, by the device, a generative artificial intelligence model to generate respective signatures that summarize the packets within a context of the test case;

grouping, by the device, the signatures based on protocols associated with the packets and to generate protocol-specific signature groups;

analyzing, by the device, each of the protocol-specific signature groups independently to detect one or more anomalies in network elements being tested by the test case;

aggregating, by the device, results from analyzing each of the protocol-specific signature groups to determine an overall result for the test case; and performing, by the device, one or more actions based on the overall result.

2. The method of claim 1, further comprising:

generating vectors for the signatures in each of the protocol-specific signature groups prior to analyzing each of the protocol-specific signature groups.

3. The method of claim 2, wherein analyzing each of the protocol-specific signature groups comprises:

performing an anomaly detection using the vectors, generated for the signatures in each of the protocol-specific signature groups, to detect the one or more anomalies in the network elements being tested by the test case.

4. The method of claim 1, wherein the network data is generated based on network interactions by multiple network elements during the test case.

5. The method of claim 1, wherein the protocols include transport protocols and application protocols.

6. The method of claim 1, further comprising:

integrating the overall result into a log and test case report.

7. The method of claim 6, further comprising:

performing a root cause analysis based on the log and test case report to determine root causes of the one or more anomalies in the network elements being tested by the test case.

8. A device, comprising:

one or more processors configured to:

receive network data in a format that includes packets generated based on a test case, wherein the network data is generated based on network interactions by multiple network elements during the test case;

utilize a generative artificial intelligence model to generate respective signatures that summarize the packets within a context of the test case;

group the signatures based on protocols associated with the packets and to generate protocol-specific signature groups;

analyze each of the protocol-specific signature groups independently to detect one or more anomalies in network elements being tested by the test case;

aggregate results from analyzing each of the protocol-specific signature groups to determine an overall result for the test case; and perform one or more actions based on the overall result.

9. The device of claim 8, wherein the generative artificial intelligence model generates a summary for each packet to form the signature for each packet.

10. The device of claim 8, wherein the one or more processors, to analyze each of the protocol-specific signature groups independently to detect the one or more anomalies in the network elements being tested by the test case, are configured to:

utilize a machine learning model to classify the protocol-specific signature groups and detect the one or more anomalies in the network elements being tested by the test case.

11. The device of claim 8, wherein the one or more processors, to aggregate the results from analyzing each of the protocol-specific signature groups, are configured to:

combine the results from analyzing each of the protocol-specific signature groups to generate a comprehensive analysis of the test case.

12. The device of claim 8, wherein the one or more processors, to utilize the generative artificial intelligence model to generate the signatures for the packets, are configured to:

generate prompts that direct the generative artificial intelligence model to extract features from the packets to form the signatures.

13. The device of claim 8, wherein the one or more processors, to analyze each of the protocol-specific signature groups independently to detect the one or more anomalies in the network elements being tested by the test case, are configured to:

utilize machine learning models, tailored to characteristics of the protocols, to analyze each of the protocol-specific signature groups independently and to detect the one or more anomalies in the network elements being tested by the test case.

14. The device of claim 8, wherein the one or more processors, to perform the one or more actions based on the overall result, are configured to one or more of:

provide the overall result for display;

cause a technician or a robot to be dispatched to service a network element based on the overall result;

cause a network element to be reconfigured based on the overall result;

cause a network element to be replaced based on the overall result; or retrain the generative artificial intelligence model based on the overall result.

15. A non-transitory computer-readable medium storing a set of instructions, the set of instructions comprising:

one or more instructions that, when executed by one or more processors of a device, cause the device to:

receive network data in a format that includes packets generated based on a test case;

utilize a generative artificial intelligence model to generate respective signatures that summarize the packets within a context of the test case;

group the signatures based on protocols associated with the packets and to generate protocol-specific signature groups, wherein the protocols include transport protocols and application protocols;

analyze each of the protocol-specific signature groups independently to detect one or more anomalies in network elements being tested by the test case;

aggregate results from analyzing each of the protocol-specific signature groups to determine an overall result for the test case; and perform one or more actions based on the overall result.

16. The non-transitory computer-readable medium of claim 15, wherein the one or more instructions further cause the device to:

integrate the overall result into a log and test case report; and perform a root cause analysis based on the log and test case report to determine root causes of the one or more anomalies in the network elements being tested by the test case.

17. The non-transitory computer-readable medium of claim 15, wherein the one or more instructions, that cause the device to analyze each of the protocol-specific signature groups independently to detect the one or more anomalies in the network elements being tested by the test case, cause the device to:

utilize a machine learning model to classify the protocol-specific signature groups and detect the one or more anomalies in the network elements being tested by the test case.

18. The non-transitory computer-readable medium of claim 15, wherein the one or more instructions, that cause the device to aggregate the results from analyzing each of the protocol-specific signature groups, cause the device to:

combine the results from analyzing each of the protocol-specific signature groups to generate a comprehensive analysis of the test case.

19. The non-transitory computer-readable medium of claim 15, wherein the one or more instructions, that cause the device to utilize the generative artificial intelligence model to generate the signatures for the packets, cause the device to:

generate prompts that direct the generative artificial intelligence model to extract features from the packets to form the signatures.

20. The non-transitory computer-readable medium of claim 15, wherein the one or more instructions, that cause the device to analyze each of the protocol-specific signature groups independently to detect the one or more anomalies in the network elements being tested by the test case, cause the device to:

utilize machine learning models, tailored to characteristics of the protocols, to analyze each of the protocol-specific signature groups independently and to detect the one or more anomalies in the network elements being tested by the test case.

* * * * *